United States Patent [19]

Geoffroi

[11] Patent Number: 4,762,979

[45] Date of Patent: Aug. 9, 1988

[54] HOLDER FOR HOLDING AN ELECTRIC SOLDERING IRON IN A USE OR A STANDBY/STORAGE POSITION

[76] Inventor: Louis E. G. Geoffroi, 10 Westdale Avenue, Nepean, Ontario, K2H 5J3, Canada

[21] Appl. No.: 937,902

[22] Filed: Dec. 4, 1986

[51] Int. Cl.⁴ .................... H05B 1/00; B23K 3/00; F16M 11/00
[52] U.S. Cl. ..................................... 219/242; D8/71; 219/230; 228/51; 228/57; 248/117.1; 248/175; 269/254 R
[58] Field of Search ................... 219/230, 242; 228/51-55, 57; D8/71; 126/236; 269/254 R; 248/117.1-117.7, 175

[56] References Cited

U.S. PATENT DOCUMENTS

| | | |
|---|---|---|
| D. 219,202 | 11/1970 | Sylvester ........................ D8/71 |
| D. 268,642 | 4/1983 | Fielder ........................ D8/71 |
| 880,871 | 3/1908 | Fell . |
| 1,616,721 | 2/1927 | Vallin ........................ 248/117.3 |
| 1,786,065 | 12/1930 | Heimberger et al. ........... 126/236 X |
| 2,174,230 | 9/1939 | Shangle ........................ 219/242 X |
| 2,191,649 | 2/1940 | Gey ........................ 248/117.3 X |
| 2,308,098 | 1/1943 | Neal ........................ 228/57 |
| 2,355,883 | 8/1944 | Mathews ........................ 219/242 X |
| 2,550,748 | 5/1951 | Woltz ........................ 219/242 X |
| 2,570,041 | 10/1951 | Wedmore ........................ 219/242 X |
| 2,887,974 | 5/1959 | Weinfeld ........................ 269/254 R |
| 3,215,815 | 11/1965 | Lerner ........................ 219/242 |
| 3,267,254 | 8/1966 | Weller et al. ........................ 219/242 |
| 3,294,348 | 12/1966 | Cerisano . |
| 3,327,981 | 6/1967 | Yates ........................ 219/242 X |
| 3,609,791 | 10/1971 | Siegel et al. ........................ 219/242 X |
| 3,990,623 | 11/1976 | Fortune ........................ 219/242 X |
| 4,065,084 | 12/1977 | Wiener ........................ 248/117.1 |
| 4,176,778 | 12/1979 | Fortune ........................ 219/242 X |
| 4,456,816 | 6/1984 | Fortune ........................ 219/242 |

Primary Examiner—Anthony Bartis
Attorney, Agent, or Firm—Arnold, White & Durkee

[57] ABSTRACT

A portable holder for a hand held type electric soldering iron which iron includes an insulated handle, a heater section and a bit. The holder includes a first support and a bit support supported in spaced relation on a base. The first support and the bit support are adapted to support an iron in a first position wherein the iron is in a stand-by or storage position with the bit in the bit support. The bit support has a shield of material to inhibit air flow about a bit contained therein. The bit support is constructed such as to prevent direct accidental contact with it. A second support spaced from the first support is with the first support adapted to hold an iron in a second position wherein the iron is held in an operable soldering position. The base is provided with a plurality of peripherally located posts about which the electric cord of the iron may be wrapped for storage. The base may also be provided with a solder drip tray, a non-magnetic bit cleaning brush, a metallic bit stripping and tinning post and a work holding spring clip. The first support, bit support and second support may be constructed integrally from a single piece of wire.

17 Claims, 2 Drawing Sheets

U.S. Patent  Aug. 9, 1988  Sheet 1 of 2  4,762,979
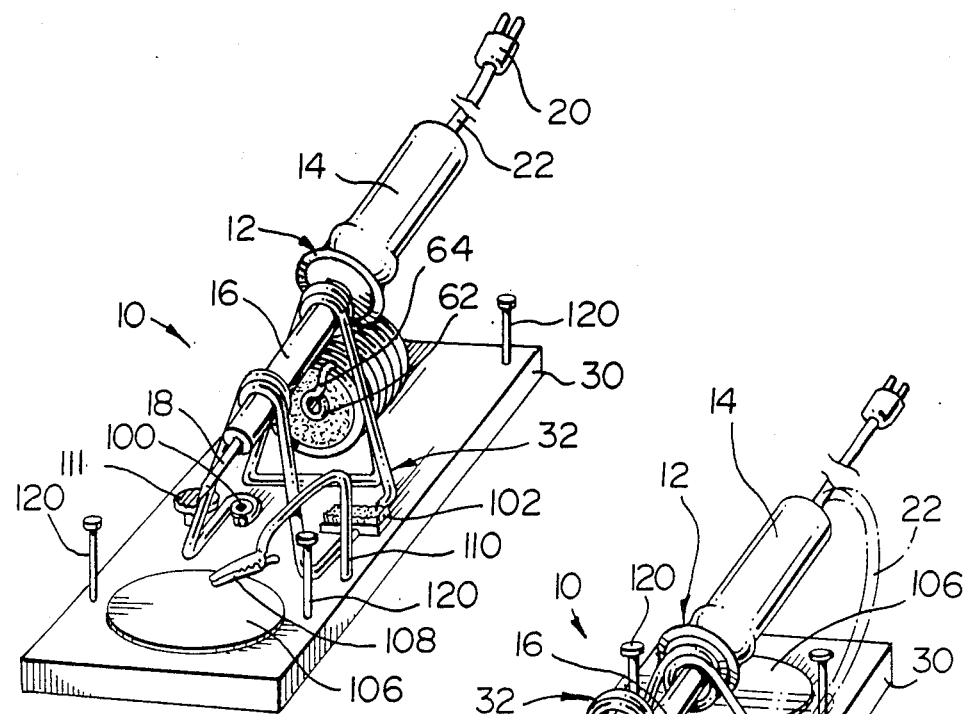
FIG. 1
FIG. 2
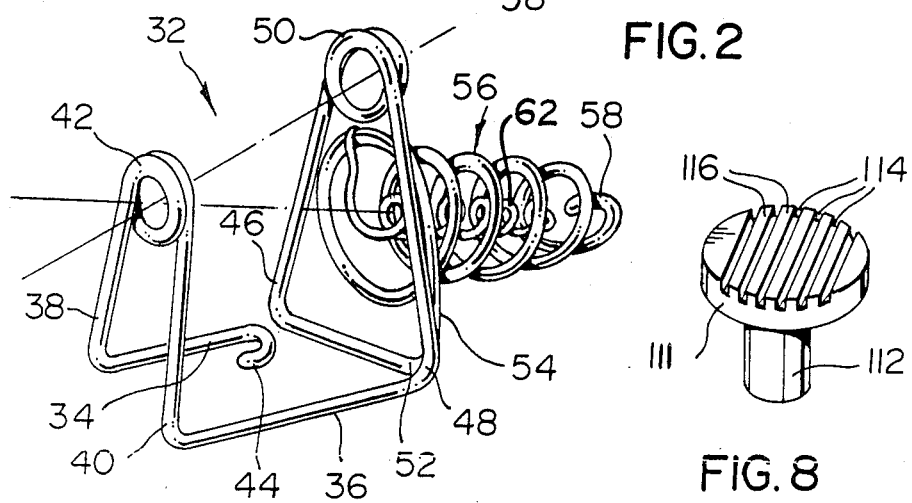
FIG. 3
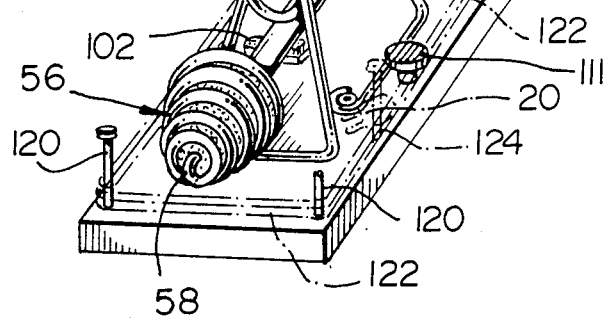
FIG. 8

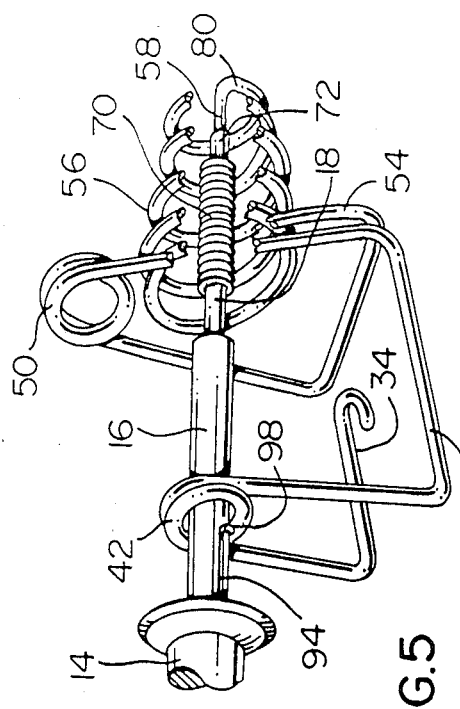
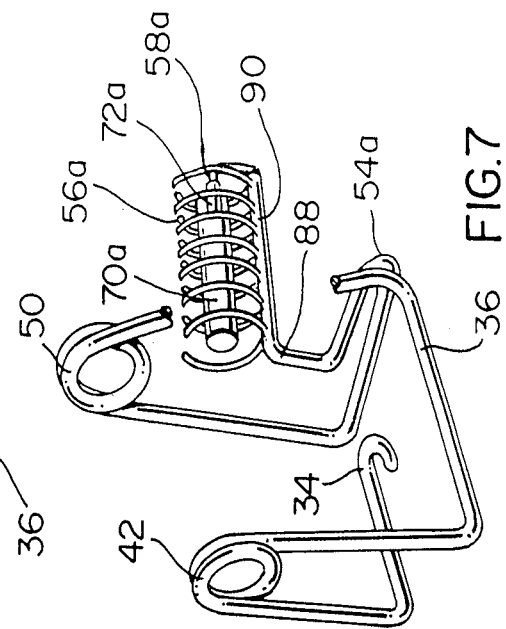
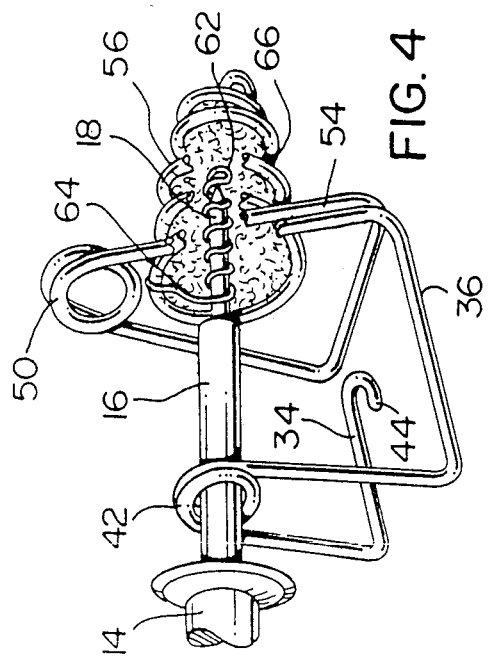
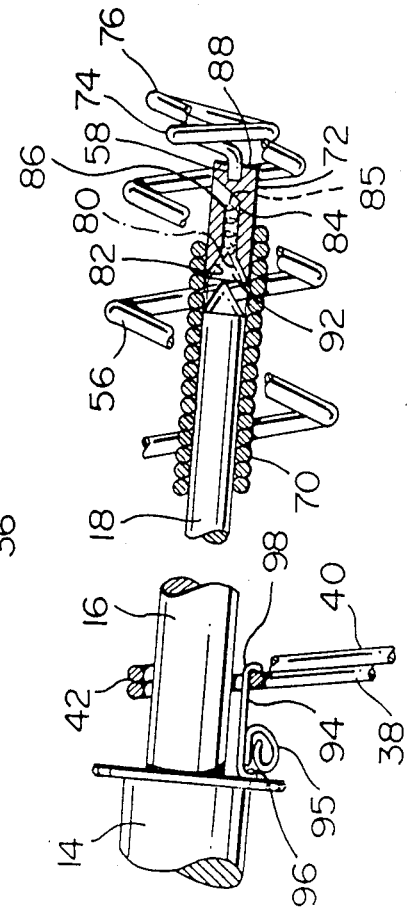

HOLDER FOR HOLDING AN ELECTRIC SOLDERING IRON IN A USE OR A STANDBY/STORAGE POSITION

FIELD OF INVENTION

This invention relates to a portable electric soldering iron holder and more particularly to a portable electric soldering iron holder including a board on which accessories for facilitating the process of hand soldering may be mounted in order to promote expeditious and efficient soldering.

BACKGROUND OF THE INVENTION

In common use are portable soldering iron holders which protect the user from accidental burn and serve to shield objects in the immediate area from ignition or heat damage. This is effectively accomplished by suspending the heated portion of the soldering iron inside the convolutions of a wire spiral, as shown in U.S. Pat. No. 880,871.

There are, however, several impediments to efficient hand soldering, which unnecessarily prolong the soldering process.

One such impediment is caused by oxidation, and the attendant corrosion of the soldering iron bit. This corrosion produces "cavities" or "pithing" in the heat transfer surface of the bit.

Periodic restoration of this contact surface necessitates the filing down of the affected part of the bit with the attendant further need for tinning or, recoating of the bit with a thin film of solder. "Tinning" the bit ensures maximum heat transfer of heat to the work pieces being soldered.

With each filing, the bit is shortened and therefore must often be replaced.

One partially successful method of reducing oxidation-corrosion of the bit is to reduce the stand-by temperature of the soldering iron. This method requires a heat-sensing mechanism for the bit which is relatively expensive. Also, with temperature control, a moment of waiting is required to allow the soldering iron to attain full soldering temperature before proper soldering can be resumed.

One common method of removing excessive solder and/or the cleaning of corrosion-debris from the soldering bit is to swab the bit with a wet sponge. However, cleaning the bit, using a wet sponge, greatly cools the soldering bit, and a moment of waiting is required before full soldering temperature of the bit is restored.

Accordingly, there is a need for a simple, yet effective soldering iron holder which reduces or inhibits air circulation about the bit when the iron is on stand-by and which also provides a more permanent means for storing the soldering iron between uses.

SUMMARY OF INVENTION

Accordingly, this invention seeks to provide a soldering iron holder including means inhibiting or reducing oxidation and the attendant deterioration of the soldering surface of the bit.

Further this invention seeks to provide a portable soldering iron holder with provision for temporary or permanent storage of a soldering iron, and with further means for positioning the iron for hands free soldering.

Still further the invention seeks to provide a soldering iron holder with means to maintain the tip of the bit tinned during stand-by and storage position.

The invention further seeks to provide means to detachably hook the iron to the holder such that the bit's contact with solder in the bit holder is enhanced.

In addition, the invention seeks to provide a work station containing the holder along with several other devices such as a non-magnetic wire brush for non-cooling cleaning of the bit, a spring clip affixed to a flexible wire for holding solder wire of various sizes, a means for cleaning and further tinning of the heat transfer surface of the soldering bit, if necessary, and projections about the perimeter of the board to permit wrapping of the electrical soldering iron cord and protect it from heat damage. This permits storage of the holder and soldering iron in a confined space before the iron has totally cooled.

The invention in one broad aspect comprehends a holder for a hand held type electric soldering iron which iron includes an insulated handle, a heater section and a bit. The holder includes first support means and bit support means. Means are provided for supporting the first support means and the bit support means in spaced relation, whereby the first support means and the bit support means are adapted to support an iron in a first position wherein the iron is in a stand-by or storage position with the bit in the bit support means. The bit support means includes means to inhibit air flow about a bit contained therein and means about the bit support means is constructed such as to prevent direct accidental contact with the bit support means.

In a preferred embodiment the holder includes second support means spaced from the first support means, the first support means and second support means being adapted to hold an iron in a second position wherein the iron is held in an operable soldering position.

The invention more particularly comprehends such a holder wherein the direct contact eliminating means comprises enclosure means spaced about the bit support means, and the bit support means in one embodiment is of a configuration to inhibit air flow about a bit supported therein. The bit support means is substantially fully within the enclosure means and includes means for holding solder adjacent the inner end of the bit support means.

In another embodiment, non-flammable material such as stainless steel pot scrubbing material may be placed between the enclosure and bit support means to inhibit air flow.

The invention further comprehends a soldering work station including the above type of holder in combination with base means, with a tray mounted to the base means in an area underneath where the bit is located when an iron is in the first position.

The work station may include a plurality of posts peripherally located on the base means about which an electric cord of an iron may be wrapped when the iron is in the second position to be stored.

Other aspects and features of the invention will become more apparent by reference to the preferred embodiments of the invention as described herein.

BRIEF DESCRIPTION OF THE DRAWINGS

FIG. 1 is a front perspective view of the work station including a holder according to the invention with a soldering iron in a use position.

FIG. 2 is a rear perspective of the work station including the holder according to the invention with a solder iron in a stand-by or non-use position.

FIG. 3 is a front perspective view of the wire iron holder.

FIG. 4 is a perspective view, partly in section, of the holder of FIG. 3 showing a soldering iron in stand-by or non-use position, bit support means and air circulation inhibiting means.

FIG. 5 is a perspective view, partly in section, of a modified embodiment of the holder and bit support means.

FIG. 6 is a sectional side view of part of the modified holder according to FIG. 5 showing the end of the spiral enclosure pulled inwardly of the end convolutions, a means to insert solder into the bit holder and hook means to pull the iron forward to melt solder within the bit holder.

FIG. 7 is a perspective view of a modified embodiment of the holder showing the bit support means having fins thereabout.

FIG. 8 is an enlarged view of the stipping and cleaning post.

DESCRIPTION OF PREFERRED EMBODIMENTS

FIGS. 1 and 2 are respectively front and rear perspective views of the work station including the soldering iron holder. More particularly, the work station 10 includes means for holding the soldering iron 12 in an operable position (FIG. 1) where soldering of a workpiece may be effected and for holding the iron 12 in a temporary stand-by or permanent storage position (FIG. 2).

The soldering iron 12 is of the hand held electric type including handle 14, heater shank section 16 and bit 18. Iron 12 further includes plug 20 and cord 22.

Work station 10 includes base 30 to which is secured holder or stand 32, more particularly illustrated in FIG. 3. Stand 32 includes bottom side support members 34 and 36 which merge into upstanding front legs 38 and 40 which in turn merge into wound front support means 42. The rearward end of bottom side support has eyelet 44. Rear upstanding legs 46 and 48 merge into rear wound support means 50, leg 48 extending upwardly from the rear of bottom side support 36.

Wound support means 42 and 50 are both sized to accommodate the heater shank section 16 of soldering iron 12 and rear support means 50 is above front support means 42. Rear upstanding leg 46 merges with a rear bottom support member 52 which member 52 is approximately perpendicular to bottom side support members 34 and 36. Rear bottom support member 52 merges into upstanding member 54 which is generally parallel to leg 48. Member 54 merges with rearwardly directed spiral enclosure 56. As will be apparent from FIG. 3, spiral enclosure 56 is generally helical in configuration, reducing in diameter proceeding away from rear support 50 to rearward end 58. The number and diameter of the spirals or convolutions in enclosure 56 is not important provided the enclosure has a size sufficient to accommodate a bit holder or supporting means in spaced relation, as will become more apparent herein.

In the embodiment of spiral portion 56 shown in FIG. 4 (as well as FIGS. 1 and 2), there is provided a bit holder 62 which is of helical spring-like configuration and supported to at least one of the helical turns of enclosure 56 by lead 64. Non-combustible corrosion inhibiting material such as stainless steel shaving material 66 is moderately packed between bit holder 62 and spiral enclosure 56. Material 66 is similar to stainless steel pot scrubbers commercially available for that purpose. The material inhibits or restricts air flow about a bit within holder 62 and inhibits corrosion and pithing of the bit 18 when the iron 12 is on temporary standby or more permanently stored position.

More specifically, while the iron 12 is in stand-by mode as shown in FIGS. 2 and 4, it is supported in bit holder so as to have the bit surrounded by the non-combustible material 66. This material 66 has the effect of impeding the circulation of air in the immediate work contact area of the bit 18. Thus, corrosion of the bit is greatly curtailed.

The porous nature of the shielding material 66 provides a controlled resistance to heat transfer from the bit, thus maintaining a slightly elevated resting temperature. This slight elevation in temperature provides the bit with extra heat to more quickly warm the (cool) workpiece and to melt the applied solder or soldering agent, thus initially accelerating the soldering process Heat emitted from the spiral enclosure 56 and material 66 is tolerable (at least momentarily) to the touch and there is no accidental burn from the bit while the iron is in stand-by position.

In the embodiment of FIG. 5, bit holder 70 is a closely wound helical spring which extends through spiral portion 56 and is sealingly attached by connector 72 to spiral end 58. In this embodiment there is no material 66 shown since closely wound helical spring holder 70 has a sufficiently closely wound configuration and sealed by connector 72, that little or no air circulates about bit 18. However, it will be appreciated that material 66 can be used to further inhibit air flow and retain heat about the bit holder in this embodiment. The interior diameter of holder 70 is slightly larger than the bit diameter, just enough to permit axial movement of the bit therein. A variation of this embodiment could be a holder comprised of a solid tube (not shown) sealingly attached to a connector 72 or to end 58.

FIG. 6 shows an enlarged sectional view of part of the apparatus shown in FIG. 5 including spiral 56, bit holder 70, handle 14, heater section 16 and front support means 42. It will be apparent that the last convolution 74 is smaller and pulled inwardly from the second last convolution 76, so that the end 58 to which bit holder 70 is connected by connector 72, is within spiral 56. This construction maintains end 58 away from the rear of spiral 56 and enhances the protection afforded by spiral 56 against accidental burn. Heat transfer between bit holder and the second last convolution 76 is not such that accidental touching of convolution 76 will burn.

The bit holder 70 of FIG. 6 is shown in cross-section and comprises a closely wound helical wire. It will be appreciated that the wire construction will inhibit air flow about the bit but it also lessens the transfer of heat between the bit and holder 70 because there is functionally point contact between the bit and the helical turns. Accordingly, the configuration of holder 70 is such that it lessens the cooling of the bit due to heat transfer while the iron is in a stand-by position.

Connector 72 has an inner end 80, pressed fitted into the end of wound holder 70 and has an end face 82 complementary to the point of bit 16. An axial bore 84 extends from end face 82 to opening 86 on the upper side of connector 72. End 58 is pressed fitted into an opening in the other end 88 of connector 72. Opening 86 is located relative to the convolutions of spiral enclosure 56 so that a rod of tinning agent, e.g. low corrosive fluxedsolder can be inserted between convolutions to place solder in opening 86. Heat transfer between holder 70 and connector 72 is such that solder originally inserted into bore 84 and opening 86 will become liquid when a bit 18 is within holder 70 adjacent face 82. Touching a solder rod to opening 86 when a hot bit is within holder 70 will replenish solder to bore 84 and end face 82. The presence of solder within the rear of holder 70 enhances the maintenance of a thin coating of tinning agent or solder on the end of bit 18. The fact that the solder cools and solidifies when the iron is stored is of little consequence since it becomes molten once the iron is plugged in.

FIG. 7 discloses a modified embodiment wherein leg 54a is bent back generally parallel with leg 52 and then upwardly rearwardly into leg 88 and into leg 90 parallel with tubular holder 70a to meet the end of the connector 72a. Thin tubular metal fins 56a are located about holder 72a to limit accidental contact with a hot bit holder 70a. It will be appreciated that with a solid tubular holder such as 70a, the holder could be manufactured to include an integral connector section for holding solder of a configuration of connector 70 of FIG. 6.

The embodiments herein provide a bit holder or support into which and from which a heated bit 18 may be easily inserted or removed. Further, spiral enclosure 56 and fins 56a provide spacing means whereby accidental momentary contact of the bit holder will not cause burns. As previously noted, air circulation is inhibited by the material 66 in the embodiment of FIG. 4. The configurations of FIGS. 5 and 7 also inhibit air circulation about the bit in stand-by and storage positions.

Some soldering irons presently on the market have heating elements that are not well ventilated and might tend to overheat if used with a holder as shown in FIGS. 4 or 5. A holder having a steel tubular bit support with thin metal fins attached thereto provide additional cooling. Although the fins radiate some of the excess heat, they are tolerable to the touch. Accordingly the embodiment of FIG. 7 may be adapted for use with soldering irons which have a tendency to overheat. The tubular metal bit holder 70a provides a more continuous and intimate contact with bit 18. The fins 56a are shown as thin tubular metal fins extending from leg 90 but it will be appreciated that they could be radiator "disc type" fins or thin tubular fins extending directly from tubular holder 70a in order to dissipate more heat. Their design would still be such as to be tolerable to touch and eliminate possible accidental burn from bit holder 70a.

Because there is (of necessity) free exposure to air only during the actual soldering process, there is much less corrosion damage to the bit and it is only necessary periodically to clean the bit of oxide and to restore the heat transfer film of solder on the bit.

With the embodiment of FIG. 6, the tip of bit 18 is maintained with a thin film of solder due to the presence of solder at face 82 of connector 72. When a heated iron is withdrawn from bit holder 70, only a thin film of solder comes with the bit. Solder "wells" in opening 86 and as it visibly lowers, new solder may be added by touching a solder rod to the connector opening 86, assuming a heated bit is within the holder 70. The affinity of solder to itself retains most of the solder within bore 84 and opening 86 and only a little solder is withdrawn with and on the end of a heated bit 18. When a hot iron is removed from the holder, some solder in opening 86 may tend to be drawn into a small puddle at the end of holder 70 adjacent face 82 as shown at 92 and then cooled. When the hot bit is reinserted into holder 70 or (70a), the end first contacts puddle 92. To enhance this contact and expedite melting of the solder, I provide a flexible hook 94 which is secured at one end 96 to the handle portion 14 spaced from the heater section 16 and extends axially a predetermined distance to hook element 98. Hook element 98 is capable of hooking one of the loops of front or first support 42. With appropriate design it will be appreciated that hooking element 98 over one of the loops will pull the iron and bit 18 forward moving the tip of the bit solidly against the surface of the solder puddle 92 (solid line, FIG. 6) present at the face 82. The inherent flexibility in spiral 56 as supported by second support 50 will create a counteracting force, whereby, as the puddle 92 of solder melts, it pushes solder back into bore 84, causing a "well" of molten solder in opening 86. The end of bit 18 firmly engages face 82 (dotted line, FIG. 6). Accordingly continuous manual pressure on the iron is not necessary to ensure good contact between the end of bit 18, solder contents of puddle 92 and subsequently end face 82. Hook 94 may be attached to handle portion 14 by any suitable fastening means including one of the screws 96 holding the heating section 16 to the handle 14, which screws are common in the art. Also shown in FIG. 6 is contact 95 which may be depressed by a thumb to release hook element 98. Contact 95 is preferably of electrically nonconductive material and its configuration is such that little thermal conductivity is encountered. It will be appreciated that hook 94 could be configured (not shown) to hook the outer periphery of the loops of support 42 with a contact extending rearwardly so that when depressed, the hook would be levered out of contact with the loops of support 42. Further it will be appreciated that the two loops of support 42 also make the hook assembly adjustable to maintain forward pressure even in the event that the bit has been subjected to filing over a period of use. Other means for adjusting the hook assembly including a series of hook elements 98 along hook 94 will be apparent to those skilled in the art. It will be further appreciated that other hooking means are possible including an eyelet device (not shown) extending outwardly from portion 42 to which hook element 98 would cooperate rather than one of the loops of support 42. Hook 94 is constructed and located on the iron such that it would not interfere with support 50 when the iron is in a position such as shown in FIG. 1.

Accordingly a solder iron is in the FIG. 2 position ready for use during various stand-by operations, the end of the bit being maintained in a holder in contact with solder. When first introducing solder to bore 84 and opening 86, a thin copper wire may be used to assist in drawing solder through bore 84. Further a length of helically wound (copper) connector wire (see U.S. Pat. No. 3,333,047) shown in dotted line 85 inserted into an appropriately sized bore 84 imparts sufficient "drag" on the tinning liquid (molten solder) to permit the holder and iron to be wall-mounted or vertically positioned with the bit down without loss of molten solder from connector 86. With this orientation the solder or tinning liquid tends to pull back into end 80. After the initial presence of solder in bore 84 and opening 86, its affinity to itself and tendency to flow to the heated bit upon its withdrawal from holder 70 will be sufficient to maintain solder within bore 84 and about face 82. Various solders on the market contain resin core which has an acid characteristic while in a molten state and can be corrosive to the end of the bit. A soldering wire known as SAVBIT TM (by Ersin Multicore) is a low corrosive flux solder and is the type of preferred solder (tinning agent) to be used in providing a "well" of solder as noted previously.

Applicant has found a simple coat hanger type of wire is satisfactory for the wire holder and any metal which can withstand the heat of the bit suitable for the bit support. For example, the bit support 62 (FIG. 1) can be of copper wire, the support 70 (FIG. 5) of spring steel type wire and the tubular bit support 70a (FIG. 7) of steel. Connector 72 or 72a however is preferably of copper since copper readily transmits heat to liquify the solder in bore 84. Also, copper has an affinity for solder and the further tendency to retain it in bore 84 and on face 82 to remain there rather than possibly being pulled out by the tip of the bit 18. Thin helical copper wire 85 or the like in bore 84 will assist in maintaining the thinning agent or low corrosive solder within the connector area.

Returning to FIGS. 1 and 2, stand 32 is secured to base 30 by means of fastening device (screw) 100, in conjunction with formed eyelet 44 as part of bottom side support member 34. In addition, non-magnetic cleaning brush 102 (such as a suede brush with brass bristles) is suitably grooved and secured by nailing or other fastener means over bottom side support member 36 and thereby holds bottom side member 36 securely to the upper surface of base 30. Brush 102 provides a means for wiping the bit free of excess solder and/or oxidation debris. Further, a clip securing means (not shown) may be associated with rear bottom support member 52 to add additional means for securing holder 32 to base 30.

Base 30 also has secured thereto solder catch tray 106 to catch any solder or other by-products of the soldering process which may drip or drop. Any suitable means (not shown) such as nails may be used to secure tray 106 to base 30 under the area where bit 18 will be located when the iron 12 is in its operable soldering position as shown in FIG. 1.

Further, as shown in FIG. 1, an "alligator" clip 108 is mounted on flexible upright stem 110 which can be rotated inwardly or outwardly from the soldering work area. Clip 108 serves to hold small objects or lengths of soldering wire as the soldering situation dictates.

Metal stripping and tinning post 111, more particularly shown enlarged in FIG. 8, is mounted to base 30 through an appropriate aperture, not shown, to accommodate shank 112 of post 111. As shown in FIG. 8, post 111 has a plurality of grooved 114 creating a plurality of ridges 116 against which the end of bit 18 may be scraped or rubbed to hone the surface of the bit and to remove excess oxide therefrom prior to re-tinning as may be necessary. The post 111 is preferably of medium hard steel.

Finally, a plurality of posts 120 are provided around which the cord 22 may be wrapped (as shown in part by dotted lines 122 in FIG. 2) for storing the iron.

A further post 124 shown in dotted lines, may be added to base 30, post 124 providing a means to which plug 20 may be secured by inserting post 124 through the apertures which usually appear in the electrical male prongs of plugs.

Accordingly, a plurality of irons such as may be used in a school class, each having its own station and holder, may be stored without concern of the hot irons coming into contact with its own wire cord or those of others stored alongside.

Much of the use and operation of the invention will be apparent from the above description. From FIGS. 1, 2 and 3, it will be apparent that front support means 42 serves a dual function in supporting the iron 12 in an operable soldering position, FIG. 1 (assuming that the solder iron is to be held by the stand rather than by a hand) and also to support the iron when the iron is in a stand-by position, where the iron may be still plugged in but not in use, and a permanent stored position such as when the iron is not plugged in and the cord is wound about the posts 122/124 provided for that purpose.

Although preferred aspects of the invention have been set forth herein, it will be appreciated by those skilled in the art that various modifications are possible without departing from the spirit of the invention.

The embodiments of the invention in which an exclusive property or privilege is claimed are defined as follows:

1. A holder for a hand held type electric soldering iron which iron includes an insulated handle, a heater section and a bit, comprising
   first support means;
   bit support means;
   base means for supporting said first support means and said bit support means in spaced relation, whereby said first support means and said bit support means are adapted to support an iron in a first position wherein said iron is in a stand-by or storage position with the bit in said bit support means;
   said bit support means including means to inhibit air flow about a bit contained therein;
   means about said bit support means constructed such as to prevent direct accidental contact with the bit support means, and second support means supported by said base means and spaced from said first support means, said first support means and second support means being adapted to hold an iron in a second position substantially opposite said first position wherein the iron is held in an operable soldering position.

2. The holder of claim 1 wherein said direct contact eliminating means comprises enclosure means spaced about said bit support means and said means to inhibit air flow comprises non-flammable material between said enclosure means and said bit support means.

3. The holder of claim 2 wherein said enclosure means comprises a spiral of wire and said bit support means is coaxial with said wire spiral and supported in part by said material.

4. The holder of claim 1 wherein said direct contact eliminating means comprises enclosure means spaced about said bit support means, said bit support means being of a configuration to inhibit air flow about a bit supported therein, said bit support means having an inner end and being supported within said enclosure means by said inner end being connected to an axially inwardly directed end of said enclosure means, whereby said bit support means is substantially fully within the enclosure means.

5. The holder of claim 4 wherein said inner end of said bit support means includes means for holding solder.

6. The holder of claim 5 wherein said means for holding solder includes a bore opening into the inner end of said bit support means and an opening rearwardly thereof for adding solder to said bore.

7. The holder of claim 6 wherein said bore opening includes an end face complementary to the tip of said bit.

8. The holder of claim 6 wherein said means for holding solder comprises a connector secured between said inwardly directed enclosure end and said bit support means.

9. The holder of claim 8 wherein the bore opening of said connector includes an end face complementary to the tip of said bit.

10. The holder of claim 1 wherein said first support means, said second support means and said means about said bit support means to prevent contact are constructed integrally from a single piece of wire.

11. The holder of claim 1 wherein said first support means is constructed such that hook means associated with the handle portion of an iron supported in said first position can operatively engage with said first support means.

12. A soldering work station, comprising:
a holder for a hand held type electric soldering iron, which iron includes an insulated handle, a heater section and a bit, said holder comprising,
first support means;
bit support means;
base means for supporting said first support means and said bit support means in spaced relation, whereby said first support means and said bit support means are adapted to support an iron in a first position wherein said iron is in a stand-by or storage position with the bit in said bit support means;
said bit support means including means to inhibit air flow about a bit contained therein;
means about said bit support means constructed such as to prevent direct accidental contact with the bit support means, and second support means supported by said base means and spaced from said first support means, said first support means and second support means being adapted to hold an iron in a second post substantially opposite said first position wherein the iron is held in an operable soldering position; and
a tray means mounted to said base means in an area underneath where said bit is located when an iron is in said second position.

13. A work station according to claim 12 further including a non-magnetic wire brush means secured to said base means with the bristles of the brush exposed.

14. The work station according to claim 12 wherein clip means is mounted to said base means such that said clip means may be moved into and away from the area above said tray for selectively holding solder or objects to be soldered.

15. The work station according to claim 12 wherein said base means includes a stripping post.

16. The work station according to claim 12 including a plurality of posts peripherally located on said base means about which an electric cord of an iron may be wrapped when the iron is in said first position to be stored.

17. A soldering iron storage holder, comprising:
a holder for a hand held type electric soldering iron which iron includes an insulated handle, a heater section and a bit, comprising,
first support means;
bit support means;
base means for supporting said first support means and said bit support means in spaced relation, whereby said first support means and said bit support means are adapted to support an iron in a first position wherein said iron is in a stand-by or storage position with the bit in said bit support means;
said bit support means including means to inhibit air flow about a bit contained therein;
means about said bit support means constructed such as to prevent direct accidental contact with the bit support means, and second support means supported by said base means and spaced from said first support means, said first support means and second support means being adapted to hold an iron in a second position substantially opposite said first position wherein the iron is held in an operable soldering position; and
a plurality of posts peripherally located on said base means about which an electric cord of an iron may be wrapped for storage when an iron is in the first position.

* * * * *